Dec. 4, 1923.
N. SEAHOLM
SURGEON'S KNIFE
Filed Dec. 30, 1922
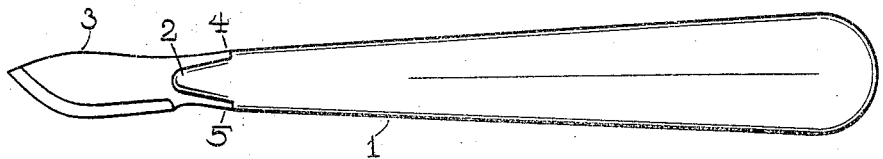
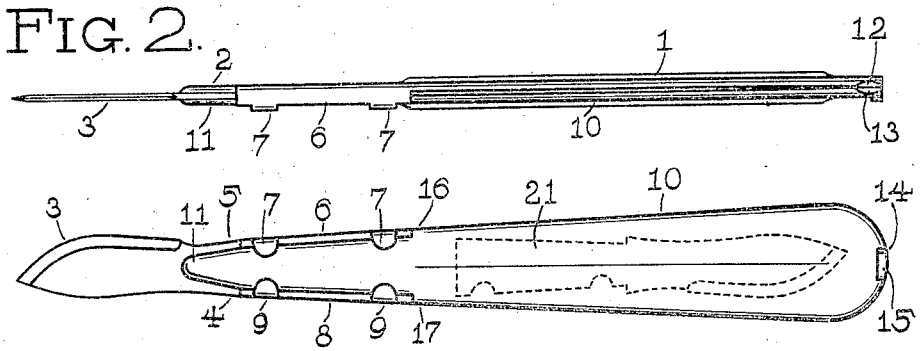
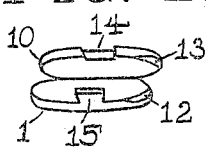 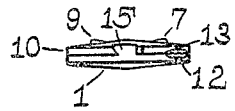
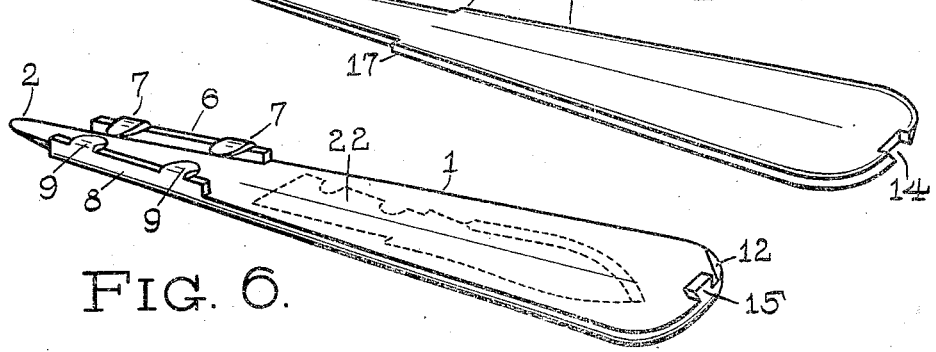
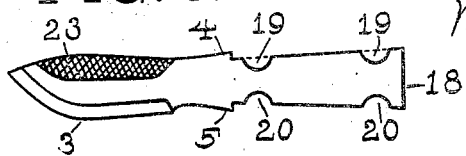
Nils Seaholm INVENTOR
BY
Frank Carlson ATTORNEY Patented Dec. 4, 1923.

1,476,185

UNITED STATES PATENT OFFICE.

NILS SEAHOLM, OF MOUNT VERNON, NEW YORK.

SURGEON'S KNIFE.

Application filed December 30, 1922. Serial No. 609,938.

*To all whom it may concern:*

Be it known that I, NILS SEAHOLM, a citizen of the United States of America, and a resident of the city of Mount Vernon, county of Westchester, State of New York, have invented a certain Surgeon's Knife, of which the following is a specification.

This invention relates to surgeons' knives, and especially to that class in which the knife has a pair of separable members adapted to be secured together as a unit and simultaneously clamp a blade between their extremities at one end of the handle.

The main object of the invention is to provide a surgeon's knife which is furnished with a detachable blade that may be sharpened or replaced at will.

Another object is to provide a knife whose members are readily and cheaply manufactured and allow for various designs of the handle.

A further object is to have a knife handle which is separable, and whose members, by virtue of their form and structure, are adapted to receive a blade in operative position at their adjacent narrow extremities, and to receive blades for storage between their body portions within their outline.

Further objects and attained advantages will appear hereinafter as this specification proceeds.

In the accompanying drawing,

Fig. 1 is a view of a knife made according to this invention.

Fig. 2 is a side view of the same.

Fig. 3 is a view of the reverse side of knife shown in Fig. 1.

Fig. 4 is an end view of Fig. 3 with the handle members in initial open position.

Fig. 5 is an end view of Fig. 3.

Fig. 6 is a perspective view of the major handle member of the knife shown in the previous views.

Fig. 7 is a similar view of the smaller or wedge member of the same knife.

Fig. 8 is a view of a detached knife blade.

Throughout the views, the same reference numerals denote the same parts.

When performing operations in hospitals and in other institutions, as well as in private practice, surgeons are very careful to sterilize their knives and to keep them sharp. Owing to the fact that the blades are permanently fixed to the knife handles, there is always present the danger of infecting a patient by using the same knife that was used on a previous case.

In order to remedy this situation, it is herein proposed to provide a knife of such character and construction, that for each operation a new, sterile and perfectly keen blade may be had.

In the practice of my invention, a handle member is provided at one extremity with a tongue 2 and within the latter with a pair of convergent walls 6 and 8. The purpose of these walls is to provide side limits for the shank 18 of a blade 3, the shank being tapered to conform with the walls, thus preventing direct withdrawal of the blade by forward movement. In order to prevent rearward movement of the blade, the latter is formed with a pair of abutment shoulders 4 and 5 which normally contact with the extremities of the mentioned walls 8 and 6, respectively.

However, in order to prevent vertical movement of the blade, a wedge member 10 of the handle is provided with a tongue 11 adapted to fit between the blade limit walls and project into a position adjacent to the tongue 2 of the other handle member 1. These walls are provided each with a pair of retaining hooks 7, 7 and 9, 9 designed to envelope the tongue 2 of the wedge member, while the shoulders 16 and 17 of the member abut the inner extremities of the mentioned walls. The knife is thus in a rigidly secured position while the wedge member is retained vertically and laterally except toward the rear. If this latter direction is locked, the handle will remain assembled. To accomplish this, the major member has been furnished with a stop 15 and the wedge member with a corresponding slot 14.

The members are so formed, that before closing the rear portion of the handle, wedge member 10 is warped to the right while the other member is warped to the left to provide side draft for stop 15 when entering slot 14. When the members are squeezed together so that these locking parts engage, they are retained thereby in assembled position as seen in Figs. 1, 2, 3 and 5.

It will be noted that the shank 18 of the blade 3 is notched at 19, 19 in order to clear the hooks 7, 7 or 9, 9 when inserting or removing the blade. If we then consider the assembly of the knife more directly, we may begin by taking the major member as shown in Fig. 6, and, taking the blade shown in Fig. 8, it is inserted sideways between the retaining walls with the notches uppermost. Then, the blade is laid down between the walls, the notches clearing the wall hooks, and the shoulders of the blade just abutting the outer extremities of the walls. The extremity of the tongue 11 of the wedge member is then laid on shank 18 of the blade, and the member pushed forward till shoulders 16 and 17 meet the mentioned side walls, care being taken that the tongue slides beneath the retaining hooks on the walls. If the handle portions 1 and 10 are then squeezed together, the lock 15 and slot 14 will engage with a snap and will remain in engagement, retaining the knife in assembled condition.

On the other hand, when it is desired to remove or replace the blade, the finger nail may be inserted between levels 12 and 13 in the members, provided for this purpose, and the stop 15 will spring out of slot 14. The handle will then appear similarly to Fig. 4, though possibly not quite so open. But, if the wedge member is now withdrawn, the blade may be lifted out and laid on the wide handle portion 1 of the major member as indicated in dotted outline in Fig. 6. It is but necessary to replace the wedge member into position and the blade will be concealed and protected within the handle as indicated in Fig. 3.

It is obvious that I may make the retaining hooks into longer single ledges if found necessary, and may make the handle members sufficiently bulged to contain a large supply of blades, and may also variously alter the appearance of the handle for greater utility and beauty.

Having thus fully described my invention, I claim,

1. An instrument comprising a pair of similar members adapted to clamp a blade shank and provided with a pair of adjacent blade reinforcing centrally disposed opposite tongues projecting along the axis of said members beyond the clamping portions thereof.

2. An instrument comprising a major member provided with a pair of opposite limit walls adjacent one extremity, a handle portion at the other extremity, a blade having a shank adapted to fit between said walls, and a wedge member provided with a handle portion and at the other extremity with a reduced portion adapted to fit the space between said walls, and in combination with the major member to retain said blade shank.

3. A cutting instrument including a major handle member having a handle portion and a clamping portion comprising a pair of opposite limit walls each having an opposite inward projection surmounting the walls and lying parallel with the main part of said member, a blade adapted to fit between said limit walls and project therefrom, and a wedge member having a handle portion terminating in a reduced portion adapted to wedge between said walls and under said projection.

4. A cutting instrument including in a pair of handle members a major member having a blade clamping portion at one extremity and at the handle extremity a locking hook, a blade adapted to be retained by said member and a wedge member having a wedge portion at one extremity adapted to wedge said blade in said major member and at the other extremity provided with a seat adapted to receive said locking hook.

5. A cutting instrument including a blade and a pair of handle members provided each with a handle portion, a clamping portion and blade reinforcement projection, said clamping portion consisting of a pair of opposite limit walls on one member surmounted by inward projections in the same plane, and in the other member of a reduced portion adapted to fit tightly between said limit walls and under said projections and a pair of stop shoulders adapted to contact with the extremities of said walls adjacent the handle portion, and finally, a locking means upon said handle portions to retain said instrument assembled.

Signed at 132 Nassau Street, in the borough of Manhattan, county of New York, city and State of New York this 26th day of December, 1922.

NILS SEAHOLM.

Witnesses:
CLARA SEAHOLM,
CARL F. WM. FORSSBERG.